(12) United States Patent
Ballinger et al.

(10) Patent No.: US 7,434,252 B2
(45) Date of Patent: Oct. 7, 2008

(54) ROLE-BASED AUTHORIZATION OF NETWORK SERVICES USING DIVERSIFIED SECURITY TOKENS

(75) Inventors: Keith W. Ballinger, North Bend, WA (US); HongMei Ge, Issaquah, WA (US); Hervey O. Wilson, Bellevue, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 10/891,884

(22) Filed: Jul. 14, 2004

(65) Prior Publication Data

US 2006/0015933 A1    Jan. 19, 2006

(51) Int. Cl.
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |
| H04L 9/32 | (2006.01) |

(52) U.S. Cl. ............... 726/10; 726/2; 726/9; 713/172; 713/182; 713/185

(58) Field of Classification Search ............... 713/172, 713/182, 185; 726/9, 10
See application file for complete search history.

(56) References Cited

U.S. PATENT DOCUMENTS

| 6,065,117 | A  | * | 5/2000 | White ......................... 713/159 |
| 6,289,462 | B1 | * | 9/2001 | McNabb et al. ............... 726/21 |
| 6,385,729 | B1 | * | 5/2002 | DiGiorgio et al. ............. 726/9 |
| 2001/0027527 | A1 | * | 10/2001 | Khidekel et al. ............ 713/201 |
| 2004/0064731 | A1 | * | 4/2004 | Nguyen et al. .............. 713/201 |
| 2004/0117430 | A1 | * | 6/2004 | Bazot et al. ................ 709/200 |
| 2004/0250074 | A1 | * | 12/2004 | Kilian-Kehr ................ 713/172 |

\* cited by examiner

*Primary Examiner*—Hosuk Song
*Assistant Examiner*—Randal D Moran
(74) *Attorney, Agent, or Firm*—Workman Nydegger

(57) ABSTRACT

A mechanism for performing role-based authorization of the one or more services using security tokens associated with received service request messages. This role-based authentication is performed regardless of the type of security token associated with the received service request messages. Upon receiving a service request message over the network for a particular service offered by the service providing computing system, the service providing computing system accesses a security token associated with the received service request message. Then, the computing system identifies one or more roles that include the identity associated with the security token, and correlates the roles with the security token. These correlated roles are then used to authorize the requested service. This mechanism is performed regardless of the type of the security token.

36 Claims, 3 Drawing Sheets

ROLE-BASED AUTHORIZATION OF NETWORK SERVICES USING DIVERSIFIED SECURITY TOKENS

BACKGROUND OF THE INVENTION

1. The Field of the Invention

The present invention relates to network technology; and more specifically, to mechanisms for performing role-based authorization of requested network services by correlating roles to security tokens associated with the request regardless of its security token type, and then later authorizing the requested services using the correlated role(s).

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Networking technologies enable computing systems to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Unfortunately, computer networks also can potentially open up connected computing systems to security breaches. One type of security breach is for one computing system or user to make false claims about who they are to thereby access network resources they should not have access to. Another security breach is referred to as "eavesdropping" by which an eavesdropper computing system accesses the content of a network communication even though the eavesdropper is an unintended and unwanted party in the communication. In addition, an eavesdropper or other entity might alter the network communication on its way to its intended destination. Any of these security breaches can be quite harmful.

In order to guard against these security breaches, a variety of security technologies have been developed. These technologies are based upon the use of security tokens. Security tokens may be used to authenticate a provider of the security token. In this manner, the security token is the comparable in the electronic domain to a passport or driver's license in the physical domain. Proper authentication provides some level of security that each party to the network communication is indeed who they purport to be. Security tokens may also be used to encrypt all or portions of a network message, thereby preventing eavesdropping by those who do not have access to the security token. Furthermore, security tokens may be used to sign portions of an electronic message to thereby allow those validating this signed portion to determine if the electronic message has been changed since the time it was signed. Authentication, encryption, and electronic signing thus provide some protection against security breaches in network communications.

Network communications increasingly extend beyond transport-level barriers. For example, a Simple Object Access Protocol (SOAP) envelope may be transmitted from one computing system to even while traveling through several transport domains. This is referred to as SOAP tunneling. A HyperText Transport Protocol (HTTP) computing system may transmit a SOAP envelope within an HTTP message to another HTTP computing system. Along the way, however, the SOAP envelope may be placed in other messages that follow different transport protocols, such as, for example, Message Queues (MQ), Simple Mail Transport Protocol (SMTP), CORBA/IIOP, or the like.

While transport-independent network messaging allows for great flexibility in communication, conventional security mechanisms are transport-dependent. End-to-end message level security across multiple transports requires additional technology. Conventional end-to-end security across multiple transport domains has been provided in the form of the Web Services (WS)-Security specification.

The WS-Security Specification only expressly addresses the use of specific security tokens such as, for example, user name token with user name and password, X.509 certificates, Kerberos tokens, and others. However, the number of types of security tokens available for use in authentication, encryption, and electronic signing is rapidly expanding. Accordingly, what would be advantageous is a mechanism for managing security tokens that is extensible to a variety of different security token types, and which is compatible with transport-independent networking technologies such as SOAP.

As a separate issue from the security services described above, it is often desirable to authorize requested service. The security services described above merely provide some assurance through authentication that the service requestor is who they purport to be, some assurance through encryption that the message has not been eavesdropped on, and some assurance through signing that the message has not been altered. However, these security services do not ensure that the authenticated identity has the right to access the service.

In order to provide proper authorization, there is typically a layer of processing needed in order to authorize, separate and apart from authentication. This processing usually relies on some expression of authorization for each service. One way of expressing authorization for a given service is to list all identities that have authority to obtain the service. This can be quite cumbersome when there are numerous identities that have authority to access the service. Another more flexible and less cumbersome way of expressing authorization for a given service is to assign particular identities to one or more roles. A "role" is an expression that may be associated with one or more, and potentially many, identities. The roles, rather than the identities, may then be mapped to specific authorized services.

The following illustrates an example code syntax that enables role-based authentication using ASP.NET. The example code access the HttpContext object to check membership with a Windows user group or Active Directory group.

[WebMethod]

```
public void AuthorizeOrder(long orderID)
{
    if (! HttpContext.Current.User.IsInRole(@"DOMAIN\Accounting"))
        throw new Exception("Only members of 'Accounting' may call this method.");
    // . . . update the database
}
```

In the following example, users in the role "HR" might call the method, but only members of the role "PointyHairedBoss" might set a salary higher than a certain amount:

```
public void SetMonthlySalary(long employeeID, double salary)
{
    if (! HttpContext.Current.User.IsInRole(@"DOMAIN\HR"))
        throw new Exception("Only members of 'HR' may call this method.");
            if (salary > 2000)
    {
        if (! HttpContext.Current.User.IsInRole(@"DOMAIN\PointyHairedBoss"))
            throw new Exception("Only pointy haired bosses may set salaries larger than 2K");
    }
            // . . . update the database
}
```

The code shown above relies on standard ASP.NET. However, this does not enable end-to-end authentication or authorization because it relies upon HTTP authentication.

Accordingly, what would be further desired is an authorization mechanism that does not rely on any specific authentication mechanism and that is flexible across different security token types to thereby enable fine-grained authorization in conjunction with end-to-end authentication.

BRIEF SUMMARY OF THE INVENTION

The foregoing problems with the prior state of the art are overcome by the principles of the present invention, which are directed towards a mechanism for performing role-based authorization of one or more services using security tokens associated with received service request messages. This role-based authentication is performed regardless of the type of security token associated with the received service request messages.

Upon receiving a service request message over the network for a particular service offered by the service providing computing system, the service providing computing system accesses a security token associated with the received service request message. Then, the computing system identifies the identity associated with the security token, and one or more roles that the identity is assigned to. The one or more roles are subsequently correlated in some fashion with the security token. These correlated roles may then be used to authorize the requested service. This mechanism is performed regardless of the type of the security token. Accordingly, authorization is flexible and may be extended to network environments in which there may be a variety of security token types used.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
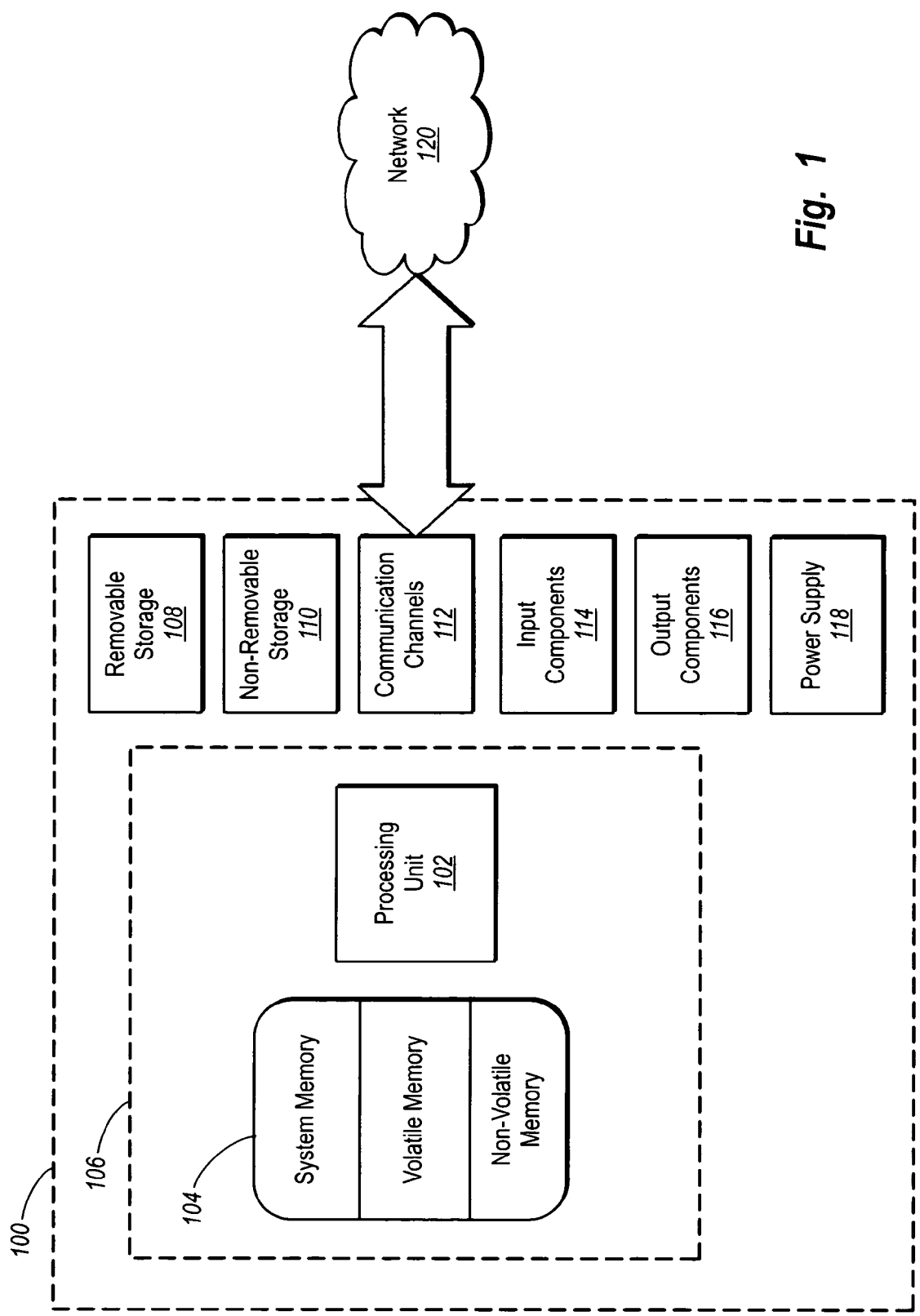
FIG. 1 illustrates a suitable computing system that may implement features of the present invention.

The principles of the present invention relate to a mechanism for performing role-based authorization of the one or more services using security tokens associated with received service request messages. This role-based authentication is performed regardless of the type of security token associated with the received service request messages.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non -removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
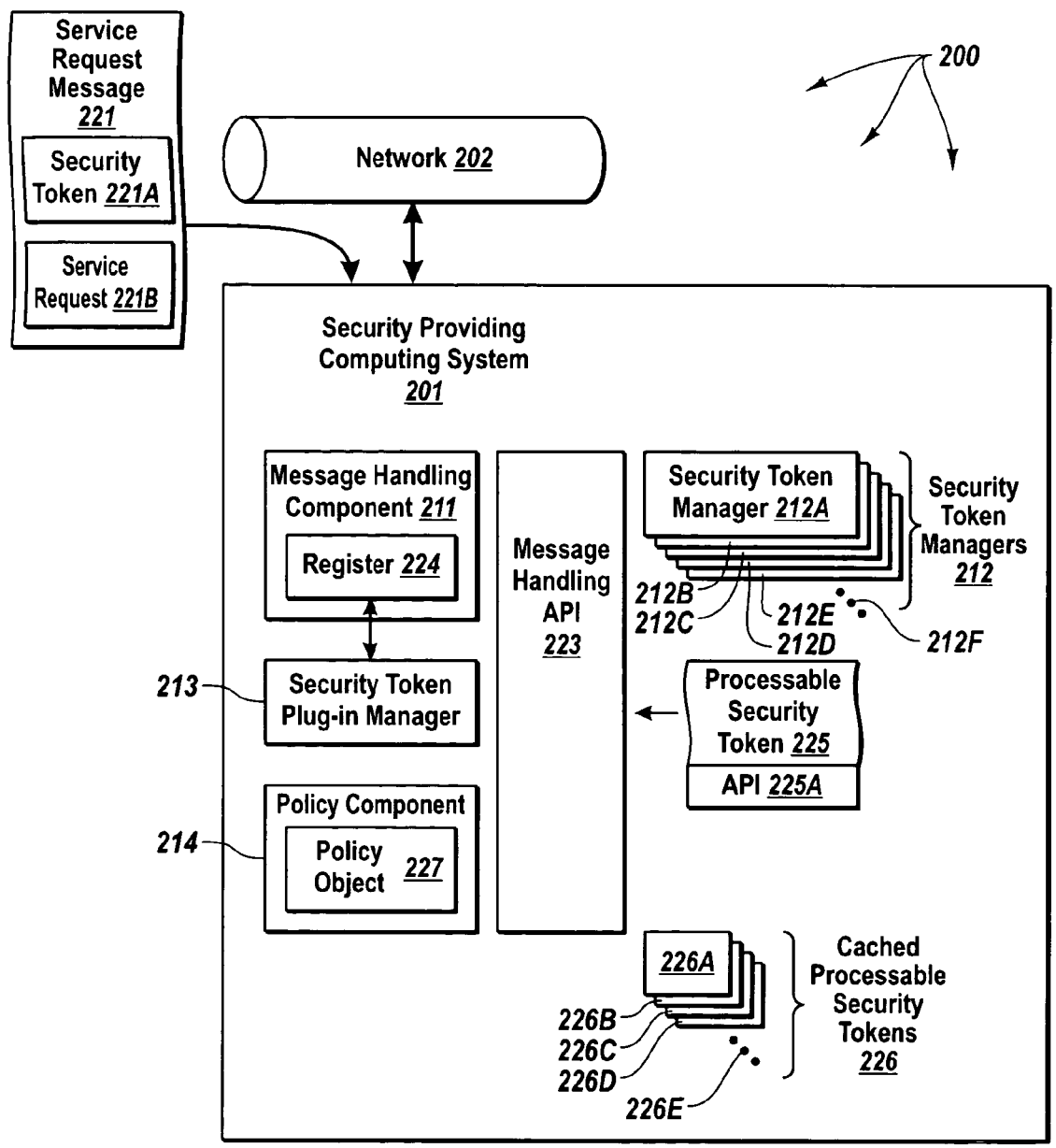
FIG. 2 schematically illustrates a network environment that includes a service providing computing system in accordance with the principles of the present invention.

FIG. 2 illustrates a network environment 200 that includes a service providing computing system 201 coupled to a network 202. The computing system 201 may be as described above for the computing system 100, although this is not required. The computing system 201 may be any computing system that is capable of implementing the principles of the present invention. In this description and in the claims, a "computing system" is defined as any device or system that has a system memory, and at least one processor capable of executing instructions from system memory. The system memory may comprise any volatile memory including Random Access Memory (RAM), flip-flops, registers, or the like. A computing system may even be a cluster of other computing systems cooperatively interacting to provide a service.

The service providing computing system 201 may have in its memory computer-executable instructions that when executed by the computing system 201 cause the computing system to instantiate several functional components in its system memory. If the computing system 201 is a cluster of computing systems, the instantiated functional components described hereinafter may be distributed.

For instance, as illustrated in FIG. 2, the service providing computing system 201 may instantiate a message handling component 211, a number of security token managers 212, a security token plug-in component 213, and a policy component 214. Each of these components may be one or more executable components. In addition, the illustrated components may be functionally distributed across multiple components. If the message handling computing system 201 were the computing system 100 of FIG. 1, the associated system memory may be, for example, memory 104, and the network 202 may be, for example, network 120.

The message handling component 211 is configured to receive network messages each associated with a security token, apply security to the received messages, authorize the requested service, and then potentially also to provide the requested service. For example, the message security component 211 may receive service request message 221 having associated security token 221A and service request 221B. A security token is "associated with" a message in that it is either included in the message, or referenced in the message.

The security token managers 212 include any number of security token managers. In the illustrated case, the security token managers include five security token managers as represented by security token managers 212A through 212E amongst potentially many others as represented by the ellipses 212F. Each of the security token managers is configured to provide security services for network messages that correspond to a security token of a particular type. Such "security services" may include authenticating the identity of a message sender based on a security token provided to it, and/or providing of a processable representation of a security token in response to receive another (e.g., XML) representation of the security token or a security token identifier. The message handling component may then rely on that authentication and/or use the processable representation of the security token for further processing such as encryption/decryption and/or electronic signing. Security services may alternatively or in addition involve the actual encryption or decryption of the message, the electronic signing of at least a portion of the message, the verifying of electronic signatures and/or the authorization itself.

As just mentioned, each of the security token managers provides security services for security tokens one particular type. For example, security token manager 212A may provide security services for messages having user name security tokens. Security token manager 212B may provide security services for Kerberos security tokens. Security token manager 212C may provide security services for X.509 certificate security tokens. Security token manager 212D may provide security services for SAML security tokens. Security token manager 212E may provide security services for XrML security tokens. Other security token managers 212F may be for SecurityContextToken, or DerivedKeyToken. In addition, there is a rapidly expanding number of security tokens becoming available for authentication, encryption, and signing. There are literally dozens of such security tokens now available. Each of the security token managers 212 interfaces with the message handling component 211 using a standardized message handling application program interface 223.

The number and variety of security token managers is expandable and contractible. In order to facilitate this, a security token plug-in component 213 registers new security token managers for new security token types with the message handling computing system 201. As example of this register is register 224. The new security token manager may include executable code for automatically notifying the security token manager plug-in component 213 of its identifier, along with the security token types that the new security token manager provides security services for.

In addition, when security token managers are to be removed (e.g., due to reduced or eliminated use of the corresponding security token type), the security plug-in manager 213 may deregister the security token manager from the message handler computing system 201 in one embodiment of the present invention.

In order to implement appropriate policy on messages having particular security tokens, a policy component 214 may also be provided. In general, policy involves rules regarding how a message having a particular security token is to be handled. For example, the policy may involve what authentication techniques are appropriate for a given security token, when encryption decryption algorithm is to be imposed for the security token, or what portions of the message are to be signed for a given security token. In addition, the policy may also govern how messages are to be treated in response to characteristics other than the security token. Furthermore, the policy may include an expression of conditions that should be satisfied before access to a service is granted. In accordance with the principles of the present invention, the expression of conditions may include, for example, an expression of acceptable roles associated with the particular security token that will permit access to a particular set of one or more services. One mechanism that permits expression of such a policy using eXtensible Markup Language (XML) is specified in the conventionally known WS-Security Policy specification. However, this specification expresses particular policy schemas only for particular security token types.

The remaining items illustrated in FIG. 2 will be described with respect to FIGS. 3, which illustrates a method for receiving and processing a service request message using in the expandable security token message handling architecture of FIG. 2. As the method 300 of FIG. 3 may be performed in the environment of FIG. 2, the method 300 of FIG. 3 will be described with frequent reference to the network environment 200 of FIG. 2.

The processes associated with receiving and processing a service request will be described generally, and also with respect to a specific embodiment in which the service request message is or includes Simple Object Access Protocol (SOAP) envelopes. SOAP is a protocol that permits transport-independent delivery of network messages since the SOAP envelope may be encapsulated using a variety of different transport protocols such as, for example, MQ, Simple Mail Transport Protocol (SMTP), CORBA/IIOP, or the like. The compatibility of the principles of the present invention with SOAP permits for the convenient end-to-end role-based authorization regardless of the security token type associated with the received service request message.

Figure 3:
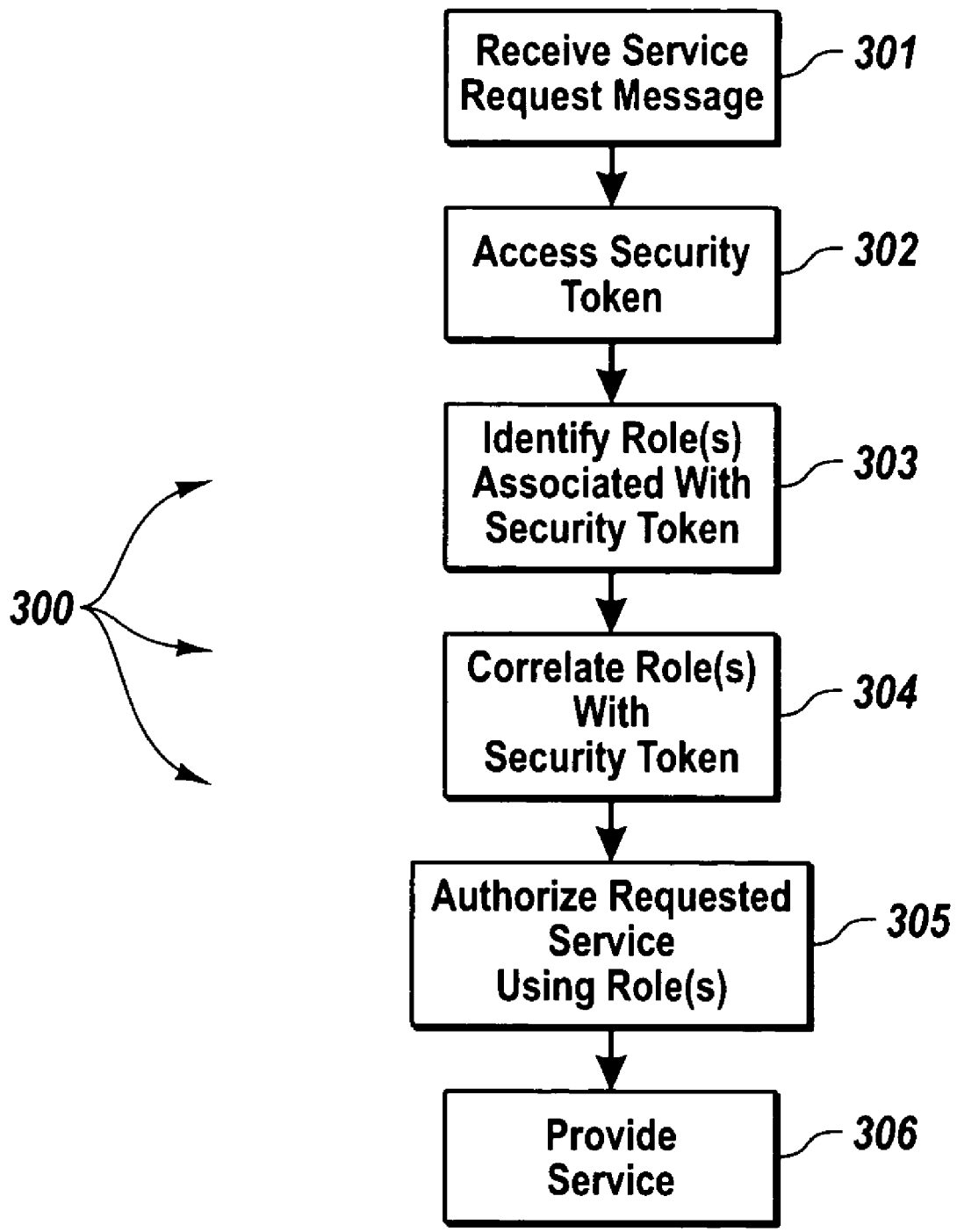
FIG. 3 illustrates a flowchart of a method for receiving and processing a service request message using in the service providing computing system of FIG. 2.

Referring to FIG. 3, the service request message is received over the network 202 (act 301). For example, the received service request message may be represented in FIG. 2 by service request message 221. As previously mentioned, the service request message 221 includes a requested service 221B, which may be expressed in the service request message 221 or implied.

The service providing computing system 201 then accesses a security token associated with the received service request message (act 302). As illustrated in FIG. 2, the service request message 221 may include the security token 221A. This embodiment will be referred to as the "security token inclusion embodiment". Alternatively, however, the associated security token 221 may not be included in the service request message 221, but may instead be acquired from another source. This latter embodiment will be referred to as the "security token reference embodiment".

The accessing of the associated security token may be accomplished in any manner. However, in the environment illustrated in FIG. 2, the message handling component 211 identifies a security token manager capable of providing a processable security token associated with the received service request message 212. To do so, the network handling component 211 deserializes and parses the received service request message 212 into its constituent components. For example, if the received network message 221 is a SOAP envelope, the constituent components may be an XML document that follows a predefined schema understood by the parser.

After this parsing, the message handling component 211 may then access the security token type in the security token inclusion embodiment, or an identifier representing the security token in the security token reference embodiment. The message handling component 211 may then use the register 224 to identify the corresponding security token manager for that security token type.

Alternatively, the message handling component may enumerate through the plurality of security token managers with information from the received network message until one of the security token managers indicates an ability to provide the processable security token associated with the received network message. This polling may be accomplished by placing calls through the message handling application program interface 223.

In one embodiment, the register 224 indicates a one-to-one correlation between security token type and the security token manager. However, a single security token manager may be capable of providing security services for more than one security token type.

The message handling component 211 then may place a call through the message handling application programming interface 223 to provide the security token identifier and/or the security token itself to the appropriate security token manager 212. For the rest of this discussion, assume that the appropriate security token manager for the security token 221A associated with the received service request message 221 is security token manager 212A.

In response, the security token manager 212A uses the security token identifier to access a stored processable security token if a security token identifier is provided as in the security token reference embodiment. The processable security token may be, for example, an executable object having a standardized interface through which another component may place calls to the processable security token to access security services associated with the corresponding security token. An example of a situation in which the security token identifier is provided, rather than the security token, is when the security token was used to decrypt on the receiving end. In that case, the security token may be a secret key not to be transmitted in the open. Accordingly, a security token identifier, rather than the security token itself, is in the network message.

Alternatively or in addition, the security token itself may be provided to the security token manager 212A as in the security token inclusion embodiment. In that case, the security token manager 212A may generate the processable version of the security token. An example of a situation in which the security token would be provided to the security token manager may be, for example, when the security token is used to authenticate the message sender, and the security token had not previously been sent to the recipient. If the network message were, for example, a SOAP envelope, the security token may be a deserialized version of the XML element that corresponds to the security token. The security token manager may receive the deserialized security token as an input, and use that to generate the processable security token. Any method for converting a deserialized security token into a processable security token will suffice.

The service providing computing system 201 then identifies one or more roles that include the identity associated with the security token (act 303), and then correlates the one or more identified roles with the accessed security token (act 304). For example, the processable security token 225 may be an object that has associated properties and methods. When the processable security token 225 is created, one of the properties that may be populated may include an identity of the entity (e.g., the name of a person) associated with the security token. The security token manager may also provide methods that allow one to query to processable security token 225 for whether the security token is associated with an identity that corresponds to a particular role (e.g., the "manager" role). The processable security token is then returned to the message handling component 211 using the message handling application program interface 223. An example of this processable security token is illustrated as processable security token 225 having a security token application program interface 225A.

The message handling component 211 may then use the processable security token 225 to perform any one of many possible security services for the security token. The security token application program interface 225A may then be used to access executable code in the processable security token 225 to authenticate the sender of the message, decrypt any encrypted portions of the network message, validate any electronically signed portions of the network message, or access any role information associated with the security token. Alternatively, the corresponding security token manager may provide any or all of these security services.

The message handling component 211 may cache processable security tokens that had been previously acquired from an appropriate security token manager. These cached processable security tokens are illustrated as cached processable security tokens 226A through 226D amongst potentially others as represented by the ellipses 226E. The processable security tokens might be cached for an appropriate duration such as for example, the duration of a session.

The message handling component 211 then may pass the received message (or a processed version of the received message) to a policy component 214. The policy component evaluates how to handle the received message using a policy object corresponding to the security token type of the security token corresponding to the received network message. The policy object may be an executable component that is also constructed by the appropriate security token manager. In one embodiment, an XML document expressing policy to be applied to the messages corresponding to a particular security token type is provided to the policy component 214. For example, an XML schema for expressing policy for a number of different security types is defined by WS-Security Policy. WS-Security Policy defines such schemas for user name and password, Kerberos, X.509 certificates, and the like.

The policy component 214 then provides the XML policy document to the appropriate security token manager through the message handling application program interface 223. The security token manager converts the XML policy document into an executable policy object, which exposes methods whereby the policy expressed in the XML policy document is applied. The policy component 214 then receives this processable policy component through the message handling application program interface 223. The policy objects correspond to security token types rather than the particular security token itself. An example of the policy object is illustrated in FIG. 2 as policy object 227.

The service providing computing system then authorizes the requested service using the one or more roles correlated with the security token that is associated with the service request message that requests the requested service (act 305). In one example, the authorization conditions for a particular security token may be expressed in the policy object for that security token. For example, the policy object may include a metadata expression of the conditions that must be met in order to receive the requested service, with at least one of the conditions including an indication that the security token must be correlated with a particular role of the one or more roles. Alternatively, the conditions may be imposed by executing an executable object that imposes role-based conditions for access to the requested service. The service providing computing system may then optionally provide the requested service (act 306) in response to a positive authorization. For example, the service providing computing system 201 may pass the service request 221B to an application program, which then services the request.

What has been described is a mechanism in which a role may be assigned to a security token regardless of its security token type. If another service request corresponding to a different security token type were to be received, the process described above may be repeated for that different security token type. Accordingly, role-based authorization is enabled in an end-to-end messaging that is transport and security-token type independent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by U.S. Letters Patent is:

1. In a network environment that includes a service providing computing system and a network connected to the service providing computing system, the service providing computing system offering one or more services, the network being capable of delivering to the service providing computing system a plurality of service request messages associated with diversified security token types, a method for the service providing computing system to perform end-to-end role-based authorization regardless of the security token type used, the one or more services using the security tokens being associated with the received service request messages despite the received service request messages having diversified security token types, the method comprising the following:

an act of receiving a service request message over the network, the service request message requesting a specific service offered by the service providing computing system to authorized users, the service request including a security token of a designated security token type, the designated security token type comprising one of a plurality of selectable security token types, and a policy component corresponding to the designated security token type, the policy component comprising rules indicating how a message with the designated security token type is to be handled;

an act of accessing the security token of the designated security token type associated with the received service request message;

an act of accessing the rules of the corresponding policy component to determine how the received service request message with the security token of the designated security token type is to be handled;

an act of identifying one or more roles associated with the security token, each role being associated with a plurality of users, the one or more roles indicating one or more specific authorized services available to identities associated with the role;

an act of correlating the one or more identified roles with the accessed security token; and an act of authorizing the requested service based on the accessed rules of the corresponding policy component and on the one or more identified correlated roles associated with the identity.

2. A method in accordance with claim 1, wherein the act of accessing a security token associated with the received service request message comprises the following:

an act of accessing the security token from the received service request message itself.

3. A method in accordance with claim 1, wherein the act of accessing a security token associated with the received service request message comprises the following:

an act of accessing a security token identification information from the received service request message; and an act of using the security token identification information to access the security token associated with the received service request message.

4. A method in accordance with claim 1, wherein the service request message is a Simple Object Access Protocol (SOAP) envelope.

5. A method in accordance with claim 1, wherein the one or more roles is a single role.

6. A method in accordance with claim 1, wherein the one or more roles is a plurality of roles.

7. A method in accordance with claim 1, wherein the accessed security token is a SAML security token type security token.

8. A method in accordance with claim 1, wherein the accessed security token is an XrML security token type security token.

9. A method in accordance with claim 1, wherein the accessed security token is a X.509 certificate.

10. A method in accordance with claim 1, wherein the accessed security token is a username/password type security token.

11. A method in accordance with claim 1, wherein the accessed security token is a SecurityContextToken.

12. A method in accordance with claim 1, wherein the accessed security token is a DerivedKeyToken.

13. A method in accordance with claim 1, wherein the act of authorizing the requested service using the one or more roles correlated with the security token that is associated with the service request message that requests the service comprises the following:

an act of accessing a metadata expression of the conditions that must be met in order to receive the requested service, at least one of the conditions including an indication that the security token must be correlated with a particular role of the one or more roles.

14. A method in accordance with claim 1, wherein the act of authorizing the requested service using the one or more roles correlated with the security token that is associated with the service request message that requests the service comprises the following: an act of executing an executable object that conditions access to the requested object at least upon the condition that the security token must be correlated with a particular role of the one or more roles.

15. A method in accordance with claim 1, wherein the service request message is a first service request message, the security token is a first security token of a first security token type, the one or more roles being a first set of one or more roles, the requested service being a first requested service, the method further comprising the following:

an act of receiving a second service request message over the network, the second service request message requesting a second service offered by the service providing computing system;

an act of accessing a second security token associated with the second received service request message, the second security token being of a second security token type that is different than the first security token type;

an act of identifying a second set of one or more roles that include the identity associated with the second security token;

an act of correlating the second set of one or more identified roles with the second accessed security token; and an act of authorizing the requested service using the second set of one or more roles correlated with the second security token that is associated with the second service request message that requests the second requested service.

16. A method in accordance with claim 15, wherein the first requested service and the second requested service is the same requested service.

17. A method in accordance with claim 1, further comprising the following:

an act of providing the requested service.

18. A method in accordance with claim 1, further comprising:

receiving a new security token with which the service providing computing system is unfamiliar;

registering a new security token manager plug-in component with the service providing computing system;

automatically notifying the new security token manager plug-in component of the security token types for which the new security token manager plug-in provides security services.

19. A computer program product for use in a network environment that includes a service providing computing system and a network connected to the service providing computing system, the service providing computing system offering one or more services, the network being capable of delivering to the service providing computing system a plurality of service request messages associated with diversified security token types, the computer program product for allowing the service providing computing system to perform end-to-end role-based authorization regardless of the security token type used, the one or more services using the security tokens being associated with the received service request messages despite the received service request messages having diversified security token types, the computer program product comprising one or more recordable-type computer-readable media having computer-executable instructions that, when executed by one or more processors of the service providing computing system, causes the service providing computing system to perform the following:

an act of receiving a service request message over the network, the service request message requesting a specific service offered by the service providing computing system to authorized users, the service request including a security token of a designated security token type, the designated security token type comprising one of a plurality of selectable security token types, and a policy component corresponding to the designated security token type, the policy component comprising rules indicating how a message with the designated security token type is to be handled;

an act of accessing the security token of the designated security token type associated with the received service request message;

an act of accessing the rules of the corresponding policy component to determine how the received service request message with the security token of the designated security token type is to be handled;

an act of identifying one or more roles associated with the security token, each role being associated with a plurality of users, the one or more roles indicating one or more specific authorized services available to identities associated with the role;

an act of correlating the one or more identified roles with the accessed security token; and an act of authorizing the requested service based on the accessed rules of the corresponding policy component and on the one or more identified correlated roles associated with the identity.

20. A computer program product in accordance with claim 19, wherein the act of accessing a security token associated with the received service request message comprises the following:

an act of accessing the security token from the received service request message itself.

21. A computer program product in accordance with claim 19, wherein the act of accessing a security token associated with the received service request message comprises the following:

an act of accessing a security token identification information from the received service request message; and an act of using the security token identification information to access the security token associated with the received service request message.

22. A computer program product in accordance with claim 19, wherein the service request message is a Simple Object Access Protocol (SOAP) envelope.

23. A computer program product in accordance with claim 19, wherein the one or more roles is a single role.

24. A computer program product in accordance with claim 19, wherein the one or more roles is a plurality of roles.

25. A computer program product in accordance with claim 19, wherein the accessed security token is a SAMIL security token type security token.

26. A computer program product in accordance with claim 19, wherein the accessed security token is an XrML security token type security token.

27. A computer program product in accordance with claim 19, wherein the accessed security token is a X.509 certificate.

28. A computer program product in accordance with claim 19, wherein the accessed security token is a username/password type security token.

29. A computer program product in accordance with claim 19, wherein the accessed security token is a SecurityContextToken.

30. A computer program product in accordance with claim 19, wherein the accessed security token is a DerivedKeyToken.

31. A computer program product in accordance with claim 19, wherein the act of authorizing the requested service using the one or more roles correlated with the security token that is associated with the service request message that requests the service comprises the following:

an act of accessing a metadata expression of the conditions that must be met in order to receive the requested service, at least one of the conditions including an indication that the security token must be correlated with a particular role of the one or more roles.

32. A computer program product in accordance with claim 19, wherein the act of authorizing the requested service using the one or more roles correlated with the security token that is associated with the service request message that requests the service comprises the following:

an act of executing an executable object that conditions access to the requested object at least upon the condition that the security token must be correlated with a particular role of the one or more roles.

33. A computer program product in accordance with claim 19, wherein the service request message is a first service request message, the security token is a first security token of a first security token type, the one or more roles being a first set of one or more roles, the requested service being a first requested service, the method further comprising the following in response to receiving a second service request message that requests a second service offered by the service providing computing system;

an act of accessing a second security token associated with the second received service request message, the second security token being of a second security token type that is different than the first security token type;

an act of identifying a second set of one or more roles that include the identity associated with the second security token;

an act of correlating the second set of one or more identified roles with the second accessed security token; and an act of authorizing the requested service using the second set of one or more roles correlated with the second security token that is associated with the second service request message that requests the second requested service.

34. A computer program product in accordance with claim 33, wherein the first requested service and the second requested service is the same requested service.

35. A computer program product in accordance with claim 19, the method further comprising the following:

an act of providing the requested service.

36. A computer system comprising the following:

one or more processors;

system memory;

one or more recordable-type computer-readable media having thereon computer-executable instructions that, when executed by the one or more processors, causes the computing system to instantiate in system memory the following:

a receiving module configured to receive a service request message over the network, the service request message requesting a specific service offered by the service providing computing system to authorized users, the service request including a security token of a designated security token type, the designated security token type comprising one of a plurality of selectable security token types, and a policy component corresponding to the designated security token type, the policy component comprising rules indicating how a message with the designated security token type is to be handled;

a security token accessing module configured to access the security token of the designated security token type associated with the received service request message;

a policy component rules accessing module configured to access the rules of the corresponding policy component to determine how the received service request message with the security token of the designated security token type is to be handled;

a role identifying module configured to identify one or more roles associated with the security token, each role being associated with a plurality of users the one or more roles indicating one or more specific authorized services available to identities associated with the role;

a role correlating module configured to correlate the one or more identified roles with the accessed security token; and a request service authorizing module configured to authorize the requested service based on the accessed rules of the corresponding policy component and on the one or more identified correlated roles associated with the identity.

* * * * *

UNITED STATES PATENT AND TRADEMARK OFFICE
CERTIFICATE OF CORRECTION

| | | |
|---|---|---|
| PATENT NO. | : 7,434,252 B2 | Page 1 of 1 |
| APPLICATION NO. | : 10/891884 | |
| DATED | : October 7, 2008 | |
| INVENTOR(S) | : Keith W. Ballinger et al. | |

It is certified that error appears in the above-identified patent and that said Letters Patent is hereby corrected as shown below:

In column 12, line 56, in Claim 16, delete "claim 15 ," and insert -- claim 15, --, therefor.

In column 12, line 59, in Claim 17, delete "claim 1 ," and insert -- claim 1, --, therefor.

In column 14, line 9, in Claim 25, delete "SAMIL" and insert -- SAML --, therefor.

In column 16, line 12, in Claim 36, delete "users" and insert -- users, --, therefor.

Signed and Sealed this
Twenty-sixth Day of April, 2011

David J. Kappos
*Director of the United States Patent and Trademark Office*